March 15, 1966     E. A. BAKER, JR     3,240,352
SAFETY LOCK FOR ADJUSTABLE STORAGE RACKS
Filed May 31, 1963     2 Sheets-Sheet 1
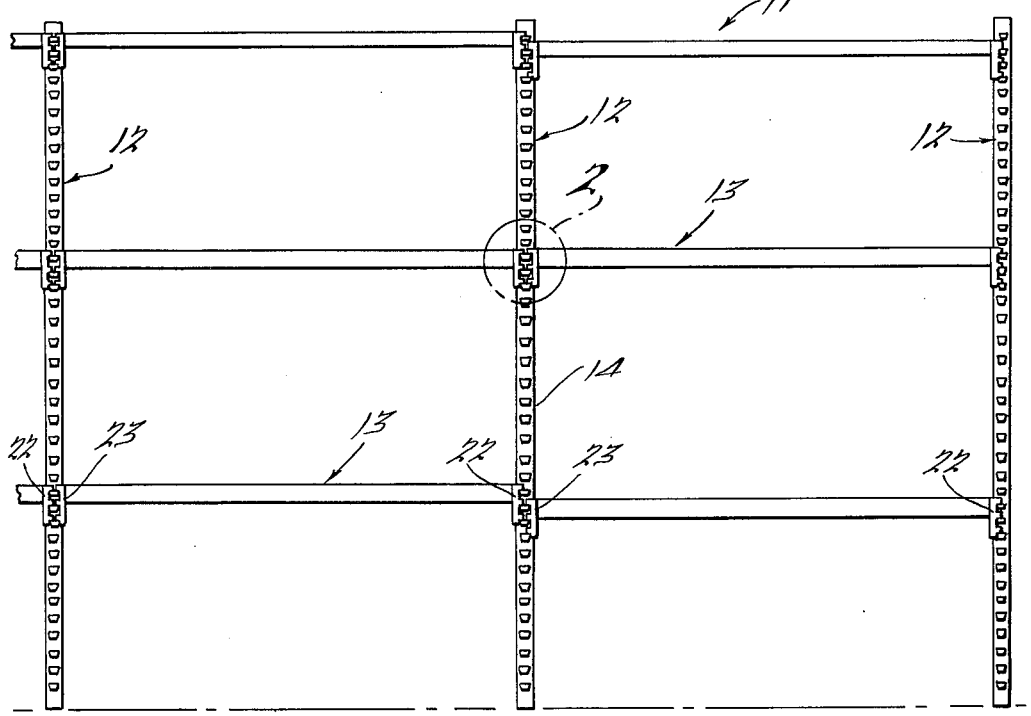
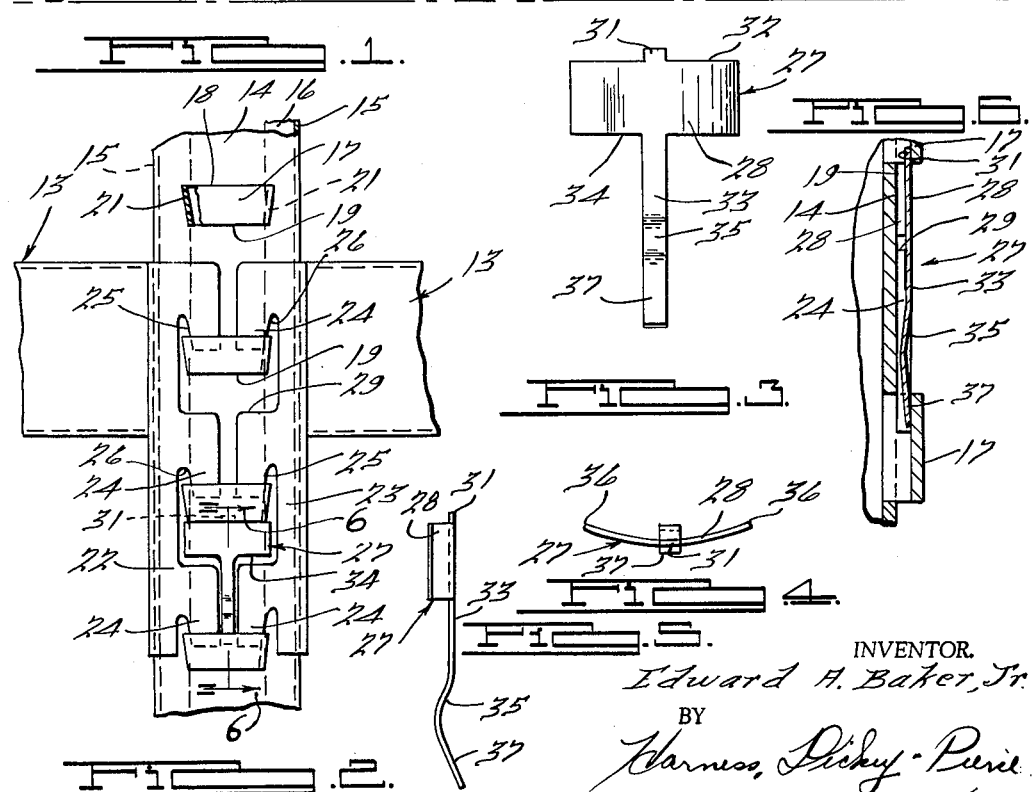
INVENTOR.
Edward A. Baker, Jr.
BY
Harness, Dickey & Pierce
ATTORNEYS March 15, 1966 E. A. BAKER, JR 3,240,352
SAFETY LOCK FOR ADJUSTABLE STORAGE RACKS
Filed May 31, 1963 2 Sheets-Sheet 2
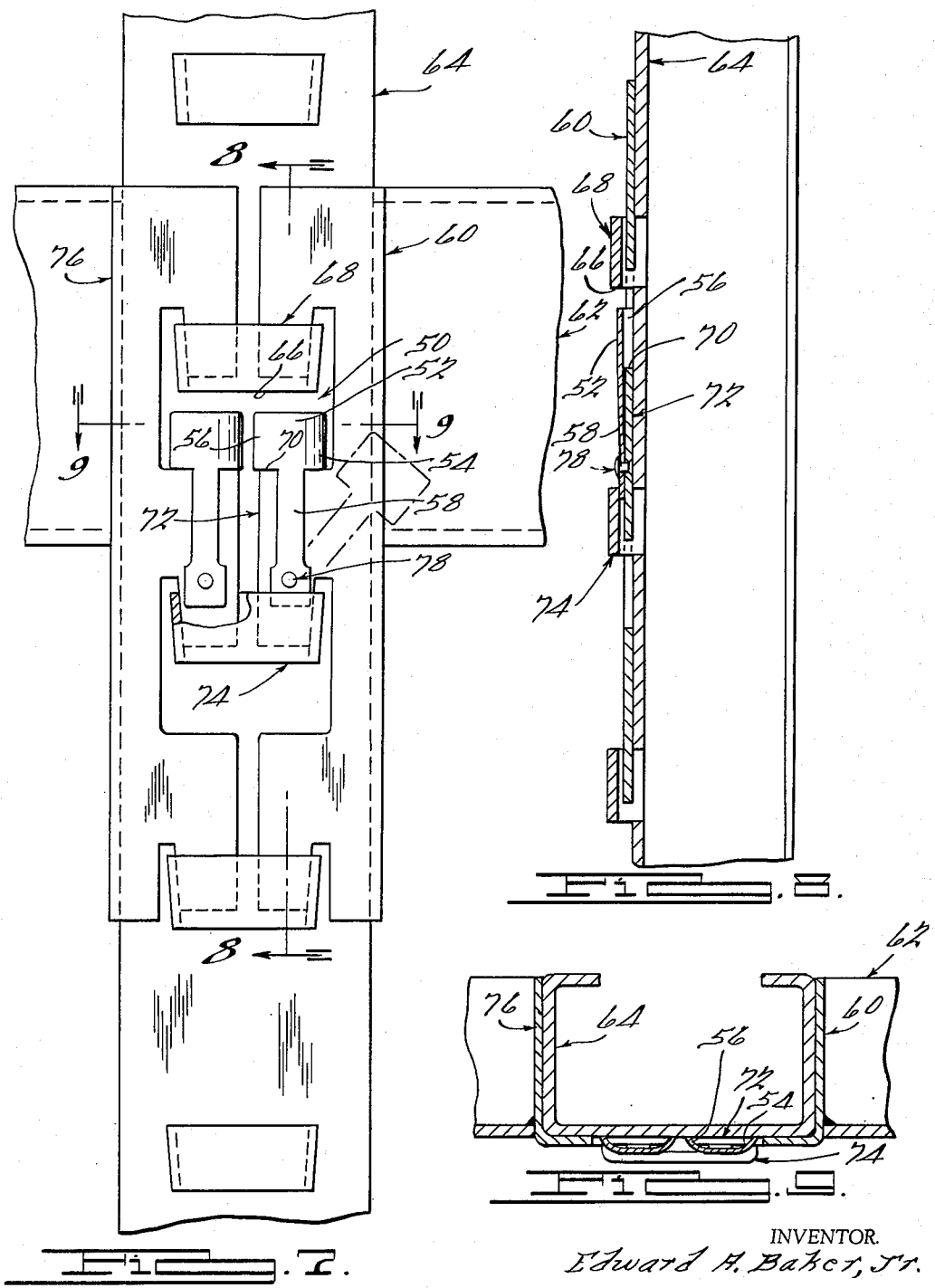
INVENTOR.
Edward A. Baker, Jr.
BY
Harness, Dickey & Pierce
ATTORNEYS.

3,240,352
Patented Mar. 15, 1966

3,240,352
SAFETY LOCK FOR ADJUSTABLE STORAGE RACKS
Edward A. Baker, Jr., Drayton Plains, Mich., assignor to Palmer-Shile Company, Detroit, Mich., a corporation of Michigan
Filed May 31, 1963, Ser. No. 284,557
12 Claims. (Cl. 211—177)

This application is a continuation-in-part of applicant's copending application Serial No. 141,047, filed September 27, 1961, now abandoned. This invention relates to adjustable storage racks for supporting and storing pallets in industrial establishments, or for similar uses, and more particularly to an improved locking construction for preventing dislodgment of portions of such racks.

It is an object of the present invention to provide a novel and improved safety locking device for an adjustable storage rack of the type described and claimed in United States Letters Patent No. 3,044,633 so as to prevent dislodgment of the rail members from the posts of such racks.

It is another object to provide an improved safety lock of this nature which will work equally well for locking one or two rail members to a post.

Another object of the invention is to provide an improved safety lock which may be secured to the ends of the rail members.

It is also an object to provide an improved safety locking construction having the above characteristics, which is extremely inexpensive to fabricate, is portable and easily mountable on the unit, and requires no modification of the basic storage rack construction.

Other objects, features, and advantages of the present invention will become apparent from the following description, the appended claims and the accompanying drawings, in which:

FIGURE 1 is a side-elevational view of a storage rack shown in assembled condition;

FIGURE 2 is an enlarged view taken in the area marked 2 of FIGURE 1 and showing one embodiment of the safety locking device positioned to lock a pair of rail members to a supporting post;

FIGURE 3 is an enlarged side-elevational view of the safety lock illustrated in FIGURE 2;

FIGURE 4 is a top plan view of the safety lock illustrated in FIGURE 2;

FIGURE 5 is a side-elevational view of the lock illustrated in FIGURE 2 in its unstressed condition;

FIGURE 6 is a cross-sectional view in elevation taken along the line 6—6 of FIGURE 2 showing the embodiment of the lock illustrated therein when in position on the storage rack;

FIGURE 7 is a view similar to FIGURE 2 illustrating a second embodiment of the safety lock of the present invention;

FIGURE 8 is an enlarged fragmentary cross-sectional view taken along the line 8—8 of FIGURE 7; and FIGURE 9 is an enlarged fragmentary cross-sectional view taken along the line 9—9 of FIGURE 7.

In general terms, the invention comprises a safety locking device of a light-weight portable character which is adapted to be positioned on a post of an adjustable storage rack of the type shown and described in the aforesaid Patent No. 3,044,633. When in position, the safety lock will be interposed between facing edge surfaces of a rail connecting member and a post slot in such manner that the connecting member may not be withdrawn upwardly from the post slot in which it has been received. The locking member is fabricated of spring-like metal and is of a generally T-shaped construction which permits simultaneously locking of one or two rail connecting members at the same level in position on a single post.

Referring more particularly to the drawings, the adjustable storage rack with which the invention is associated is generally indicated at 11 in FIGURE 1 and comprises two basic components, an end unit generally indicated at 12 and front and rear rails generally indicated at 13. A plurality of end units 12 and rails 13 are used to assemble the rack 11 to the size required.

Each end unit comprises front and rear posts 14, each of these posts being preferably fabricated of steel having the cross section of a semi-closed channel. The channel has a central web having side flanges 15 and inwardly directed flanges 16 extending toward each other from the outer ends of the flanges 15. The front and rear posts 14 of each end member 12 are disposed in spaced parallel relation, and are rigidly connected by a plurality of horizontal cross members and diagonal braces (not shown).

The outwardly facing web portions of the posts 14 are provided with a plurality of pressed-out slot portions 17 in vertically spaced relation. Each of these slot portions has an upper horizontal edge 18 and a lower horizontal edge 19, as well as a pair of side walls 21 which extend downwardly and incline slightly toward the centerline of the post.

Each rail member 13 is in the form of a closed box section in the embodiment illustrated, with all rail members being of identical size and construction. A pair of connecting elements 22 and 23 are secured to opposite ends of each rail member 13. Each connecting member 22 and 23 is of angular cross-sectional shape for securing to the post 14, the two connecting members 22 and 23 being of opposite hand. Each connecting member has a first flange welded or otherwise secured to an end of the member 13, and an engaged flange extending outwardly therefrom. The members 22 and 23 extend a substantial distance below the members 13, and each flange is provided with a plurality of downwardly extending engaging hooks 24, three such hooks being shown in the illustrated embodiment. These hooks are spaced apart the same distance as the slot portions 17. Each hook 24 has a tapered inner edge 25, this edge being contiguous with an upwardly extending cutout portion or recess 26 in the flange. The spacing of the edges 25 from the outer surface of the main portion of the member 22 or 23, relative to the spacing of the slot side walls 21 from the post flanges 15, is such that when the hooks 24 enter the slotted portions 17, the side walls 21 will wedge connecting the members 22 and 23 against the post 14, the edges 25 having substantially the same inclination as the side walls 21.

To assemble the storage rack 11, the units 12 will be held vertically and in spaced parallel relation, and the rail members 13 will be mounted thereon by means of the connecting elements 22 and 23, the rail members being placed at the proper height for the desired storage purpose. Because of the close spacing of the slots 17, accurate selection of the rail member height will be greatly facilitated. As each connecting member 22 or 23 is slipped into position within three adjacent slotted portions 17, it will be drawn securely against the post 14 with a frictional wedging action. The slotted portions 17 will engage the sides of the hooks 24 to prevent movement of the connecting elements 22 and 23 away from the web portions of the post 14. The slotted portions 17 are wide enough, as seen in FIGURE 2, to accommodate the connecting members 22 or 23 from two rail members on opposite sides of the post. The upper ends of the recesses 26 will not engage the side walls 21, so that there will be no direct load solely on the hooks 24, the force also being exerted against the flanges 15 of the post 14. As a weight is placed on each pair of rails, the wedging action will become even tighter, thus enhancing rigidity of the assembly.

As shown in FIGURES 2 through 6, one embodiment of the present invention is generally indicated at 27 and comprises a T-shaped member fabricated of spring steel or similar material. The main or locking portion 28 of the lock 27 is of arcuate rectangular shape as seen in FIGURE 4, and for purposes described below the height of this portion as seen in FIGURE 3 is less than the distance between the lower edge 19 of a slotted portion 17 and the upper horizontal edge 29 of the tooth 24 next below when a connecting member 22 or 23 is inserted in the slots. The width of the locking portion 28 is greater than the inside dimensions of the lower edge 19 of each slotted portion 17, so that when the portion 28 is urged upwardly it will be blocked by lower edge 19.

A first mounting portion comprising a tab 31 extends a short distance upwardly from the upper edge 32 of the locking portion 28, and a second mounting portion 33 extends downwardly from the central portion of the lower edge 34 of the locking portion 28. The total height of the locking portion 28 and tab 31 does not exceed the distance between edges of a slot 19 and a tooth 24 described above. The width of the extension 33 is slightly less than the distance between facing edges of the hooks 24 on a pair of connecting members 22 and 23 mounted in the same slot 17. The extension 33 is of sufficient length to permit its lower end to be inserted in the upper central portion of a slot 17 when the tab 31 engages the inside of the lower portion of the slot 17 next above. An intermediate portion 35 of the extension 33 is inclined upwardly and outwardly as seen in FIGURE 5. When the lock is in position, the edges 36 of the portion 28 will engage the outer surface of the post 14. The unstressed depth of the arcuate portion 28 is approximately equal to the distance from the outer surface of a slotted portion 17 to the outer surface of the main portion of the post 14. The arcuate portion 28 must therefore be stressed by flattening in order to insert the tab 31 in its slots 17. The lower end 37 of the extension 33 is inclined downwardly and outwardly in its unstressed condition beyond the outer surface of the locking portion 28, so that when inserted in its slot 17 it will augment the frictional grip of the lock.

In use, a number of locks 27 will be provided for the unit 11, depending upon the number of rails 13 available. When it is desired to lock one or two connecting members 22 and 23 in position, the lower end of a lock 27 will be inserted in a slotted portion 17 so that the main portion 28 of the lock 27 will be disposed between the lower edge 19 of the slot 17 next above and the upper edge or edges 29 of the hook or hooks 24 adjacent the lock 27. The locking portion will then be pressed inwardly against the post until the tab 31 may be slipped upwardly within its slot 17, the tab being urged outwardly by the stressed locking portion against the inside of the slot 17. Due to the arcuate nature of the portion 28 which is blocked by the lower edge 19 of the slot 17, this portion will block any accidental upward movement of the hooks 24 which could otherwise result in dislodgment of the connecting members 22 or 23. The intermediate portion 35 of the extension 33 will be disposed alongside the edge or edges of the adjacent hooks 24. The portion 35 will thus cooperate with the upper edge 32 of the lock 27 to prevent cocking of the lock in either direction from the position shown in FIGURE 2 to such an extent as to permit dislodgment of a hook 24, even when only one hook is being locked.

The lock 27 may be placed adjacent any hook or hooks 24, and only one lock need be used for each connecting member, or for two connecting members when they have at least two hooks in facing relation as seen in FIGURE 2. The lock will be held in position by its spring-like nature and will not tend to cock, even when only one connecting member 22 or 23 is being held.

The lock 27 will not interfere in any way with the normal operation of the parts 12 and 13 of the rack 11, and particularly the wedging action which creates the rigid assembly described above. As will be noted in FIGURE 2, any additional load placed on a rail member 13 forcing its connecting member 22 or 23 slightly downwardly will not be blocked by the presence of the lock 27. Instead, the upper edge 29 of the hook 24 blocked by the lock 27 will move downwardly into further spaced relation with the lower edge 34 of the lock. The lock will still be effective since any subsequent accidental upward shifting of the connecting member 22 or 23 will only be possible for a slight distance until the edge 34 of the lock 27 is re-engaged and the upper edge 32 engages the lower slot edge 19.

In FIGURES 7–9 a second embodiment of the present invention is illustrated, generally designated 50. The lock 50, which is of a generally T-shaped configuration preferably fabricated of spring steel or similar material, comprises a locking portion 52 of a generally rectangular shape having arcuately shaped sides 54 and 56, and a mounting portion 58 depending downwardly therefrom.

The lock 50 functions to prevent accidental upward shifting of a typical horizontal connecting member 60 and rail 62 with respect to a vertically extending post 64 in the same manner as the lock 27 functions to prevent inadvertent disassembly of connecting member 13 from the post 14. Accordingly, the size of the locking portion 52 is closely related to the size of the locking portion 28 of the lock 27 in that the height of the locking portion 52 is less than the distance between a lower horizontal edge 66 of a slotted portion 68 and an upper horizontal edge 70 of a tooth 72 inserted within a second slotted portion 74. However, in this embodiment of the invention, the width of the locking portion 52 is substantially the same as the width of the teeth 72, the locking portion 52 being sufficiently wide to engage the lower edge 66 of the slotted portion 68 while permitting two connecting members 60 and 76 to be adjacently supported and locked on the post 64, as will be described.

In this embodiment of the invention the mounting portion 58 of the lock 50 is pivotally connected, as by a rivet 78, to the tooth 72, and is adapted to be pivotally biased to and from locked and unlocked position, as is illustrated by the phantom lines in FIGURE 7. Accordingly, at such time as the locking portion 52 is disposed in the unlocked position, an upward biasing of the connecting member 60 with respect to the post 64 results in disengaging the hooks on the connecting member 60 from their associated slotted portions on the post 64, and conversely, when the locking portion 52 is in the locked position, disengagement of the connecting member 60 from the post 64 is prevented due to the engagement of the upper edge of the locking portion 52 with the lower edge 66 of the slotted portion 68. One of the primary advantages of this feature is that since the locks are pivotally secured directly to the ends of the connecting members, they are always readily available for immediate use. Furthermore, since the locks are pivotally secured to the connecting members, the possibility of their being mislaid or lost is virtually eliminated.

Since the lock 50 is of a spring steel construction, the locking portion 52 is resiliently maintained against the post 62 when in the locked position, thus preventing free movement of the lock 50 and, accordingly, in order to pivot the lock 50 from the locked to the unlocked position, it is necessary first to bias the locking portion 52 outwardly from the surface of the post 64 and beyond the outer surface of the tooth 72 after which the lock may be pivoted about the axis of the rivet 78 to the unlocked position.

As best seen in FIGURE 7, the width of the locking portion 52 is substantially the same as that of the tooth 72, thus permitting two connecting members 60 and 76 to be adjacently fastened and locked to the vertical post 64 without the lock of one connecting member interfering with the lock or locking action of the adjacent member and, as such, the assembly or disassembly of either of the connecting members from the post 64 is completely independent from that of the adjacent member.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In combination with an adjustable storage rack of the type having a plurality of vertical posts with outwardly extending equidistantly spaced pressed-out portions forming slots and a plurality of rails having end connecting members with hooks inserted downwardly in said slots so that the upper edge of each hook is spaced a predetermined distance below the lower edge of the pressed-out portion next above, a locking device mounted on said rack comprising a member having a horizontal locking portion and a vertical mounting portion, said mounting portion extending from said locking portion and including means biasing said locking portion against said post, said locking portion having a vertical dimension such that it occupies a major portion of said predetermined distance between said edges when biased against said post whereby dislodgment of the end connecting member from the post to which it is connected will be prevented.

2. In a combination with an adjustable storage rack of the type having a plurality of vertical posts with outwardly extending equidistantly spaced pressed-out portions forming slots and a plurality of rails having end connecting members with hooks inserted downwardly in said slots so that the upper edge of each hook is spaced a predetermined distance below the lower edge of the pressed-out portion next above, a locking device comprising a member having a horizontal locking portion and a vertical mounting portion, said mounting portion being inserted in one of said slots in which a hook has been inserted, said locking portion having a vertical dimension such that it occupies a major portion of said predetermined distance between said edges when said mounting portion is so inserted, whereby dislodgment of said hook from the slot in which it is engaged will be prevented.

3. The combination according to claim 2, said locking portion being of arcuate shape concave toward said post and of spring-like material, and urging said mounting portion against the pressed-out portion forming the slot in which said mounting portion is inserted.

4. The combination according to claim 3, said mounting portion comprising a tab extending from said locking portion, and a second mounting portion opposite said first mounting portion and engaged with said pressed out portion next above.

5. The combination according to claim 4, wherein an intermediate section of said second mounting portion is inclined toward said post.

6. In combination with an adjustable storage rack of the type having a plurality of vertical posts with outwardly extending equidistantly spaced pressed-out slotted portions and a plurality of rails with end connecting members having hooks engaged with said slotted portions so that the upper edge of each hook is spaced a predetermined distance below the lower edge of the pressed-out portion next above, a locking device comprising a horizontally extending locking portion, said locking portion being of spring-like material and arcuate shape and having an unstressed depth of arc slightly greater than the outward extent of the inside surfaces of said slotted portions from said posts, said locking portion being adapted to be pressed against a post between said edges in a position concave toward said post and having a vertical dimension occupying a major portion of said predetermined distance whereby dislodgment of a hook below said locking portion from its slotted portion by upward movement will be prevented, a first mounting portion comprising a tab extending from one arcuate edge of said locking portion and inserted within an adjacent slotted portion next above when said locking portion is so pressed against said post, and a second mounting portion comprising an extension from the opposite arcuate edge of said locking portion, the outer end of said extension in its unstressed condition protruding outwardly beyond said slotted portions, said outer end being inserted in the slotted portion containing said hook.

7. In combination with an adjustable storage rack of the type having a plurality of posts with vertically arranged equidistantly spaced pressed-out slotted portions having downwardly and inwardly inclined side edges and a plurality of rails having end connecting members with a plurality of vertically arranged equidistantly spaced hooks engaged with said inclined slotted portion side edges to wedge said connecting members against said post so that the upper edge of each hook is spaced a predetermined distance below the lower edge of the pressed-out portion next above, a locking member comprising a generally T-shaped element fabricated of spring-like metal and having a horizontally extending locking portion of arcuate shape with outer vertical edges engaged with the main outer post surface, said locking portion being adapted to be pressed against a post between said edges and having a vertical dimension such that it occupies a major portion of said predetermined distance whereby dislodgment of a hook below said locking portion from its slotted portion by upward movement will be prevented, the unstressed depth of said arc being approximately equal to the distance from the outer surface of a slotted portion to the main outer post surface, a tab extending upwardly from the upper edge of said locking portion, the combined height of said locking portion and said tab not exceeding the distance between said edges, and a mounting portion on said locking member extending downwardly from the lower edge of said locking portion, the lower end of said mounting portion being inserted in one of said slotted portions and being frictionally engageable with the inner surface thereof, the length of said mounting portion being such that said locking portion is disposed between the upper edge of the adjacent connecting member hook and the lower edge of the slotted portion next above.

8. In combination with an adjustable storage rack of the type having a plurality of posts with vertically arranged equidistantly spaced pressed-out slotted portions having downwardly and inwardly inclined side edges and a plurality of rails having end connecting members with a plurality of vertically arranged equidistantly spaced hooks engaged with said inclined slotted portion side edges to wedge said connecting members against said posts so that the upper edge of each hook is spaced a predetermined distance below the lower edge of the pressed-out portion next above, a locking member comprising a generally T-shaped element fabricated of spring-like metal and having a horizontally extending locking portion of arcuate shape with outer vertical edges engaged with the main outer post surface, said locking portion being adapted to be positioned against a post between said edges and having a vertical dimension such that it occupies a major portion of said predetermined distance whereby dislodgment of a hook below said locking portion from its slotted portion by upward movement will be prevented, the unstressed depth of said arc being approximately equal to the distance from the outer surface of a slotted portion to the main outer post surface, and a mounting portion on said locking member extending downwardly from the lower edge of said locking portion, the lower end of said mounting portion being pivotally connected to an end connecting member on one of said rails and operable to pivotally bias said locking portion to and from a locked or unlocked position, the length of said mounting portion being such that said locking portion is disposed between the upper edge of the adjacent connecting member hook and the lower edge of the slotted portion next above when said locking portion is in the locked position.

9. In combination with an adjustable storage rack of the type having a plurality of vertical posts with outwardly extending equidistantly spaced pressed-out portions forming slots and a plurality of rails having end connecting members with hooks inserted downwardly in said slots so that the upper edge of each hook is spaced a predetermined distance below the lower edge of the pressed-out portion next above, a locking device comprising a member having a horizontal locking portion and a vertical mounting portion, said mounting portion being pivotally connected to one of said downwardly inserted hooks and operable to pivotally bias said locking portion to and from a locked or unlocked position, said locking portion having a vertical dimension such that it occupies a major portion of said predetermined distance between said edges when in said locked position, whereby dislodgment of said hook from the slot in which it is engaged will be prevented.

10. The combination according to claim 9, wherein said locking portion is of an arcuate shape concave toward said post, and said mounting portion is of a spring-like material adapted to resiliently maintain said locking portion against said post while in said locked position.

11. The combination according to claim 10, wherein the combined height of said locking portion and said mounting portion occupies a major portion of the vertical distance between two adjacent spaced pressed-out portions when said locking portion is in said locked position.

12. In combination with an adjustable storage rack of the type having a plurality of vertical posts with outwardly extending equidistanctly spaced pressed-out slotted portions and a plurality of rails with end-connecting members having hooks engaged with said slotted portions so that the upper edge of each hook is spaced a predetermined distance below the lower edge of the pressed-out portion next above, a locking device comprising a horizontally extending locking portion, said locking portion being of spring-like material and arcuate shape and having an unstressed depth of arc slightly greater than the outward extent of the inside surfaces of said slotted portions from said posts, said locking portion being adapted to be positioned against a post between said edges in a position concave toward said post and having a vertical dimension occupying a major portion of said predetermined distance whereby dislodgment of a hook below said locking portion from its slotted portion by upward movement will be prevented, and a mounting portion extending from one arcuate edge of said locking portion and being pivotally connected to one of the hooks on the end-connecting members of each of the rails, said mounting portion operable to bias said locking portion to and from a locked and unlocked position and adapted to resiliently maintain said locking portion against said post while in said locked position.

References Cited by the Examiner
UNITED STATES PATENTS

| | | | |
|---|---|---|---|
| 2,123,231 | 7/1938 | Clemence | 248—214 X |
| 2,639,042 | 5/1953 | Lambert | 211—182 X |
| 2,895,619 | 7/1959 | Frazier | 211—148 X |

CLAUDE A. LE ROY, *Primary Examiner.*

FRANK L. ABBOTT, *Examiner.*